United States Patent [19]

Bonner et al.

[11] 4,408,243
[45] Oct. 4, 1983

[54] TAPE CLEANER

[75] Inventors: Clive E. Bonner; Herbert F. Sanford, both of Littleton, Colo.

[73] Assignee: Honeywell Inc., Minneapolis, Minn.

[21] Appl. No.: 295,151

[22] Filed: Aug. 21, 1981

[51] Int. Cl.³ .............................................. G11B 5/76
[52] U.S. Cl. .................................... 360/137; 360/128
[58] Field of Search ...................... 360/137, 128, 74.2; 15/99, 100, 256.5

[56] References Cited

U.S. PATENT DOCUMENTS

| 3,616,478 | 11/1971 | Martz et al. | 15/256.5 X |
| 3,945,079 | 3/1976 | Westberg | 15/100 |
| 4,010,514 | 3/1977 | Fischer et al. | 360/137 X |
| 4,257,079 | 3/1981 | Yoshizawa | 360/137 |
| 4,333,115 | 6/1982 | Junio | 360/74.2 |

Primary Examiner—Alfred H. Eddleman
Assistant Examiner—Kin Wong
Attorney, Agent, or Firm—Lockwood D. Burton; Mitchell J. Halista

[57] ABSTRACT

A tape cleaner for cleaning debris from the surface of a recording tape uses a tape wiping or cleaning medium advanced across the surface of the recording tape at a speed correlated with a selected speed of operation of the recording tape. The tape wiping medium may be in the form of cleaning tape driven between a supply reel and a take-up reel by a stepping motor driving the take-up reel at a sub-multiple of the selected recording tape speed. Thus, the speed of the cleaning medium is automatically selected by selection of the recording tape speed, and, to minimize the usage of the cleaning medium, the cleaning medium is driven at a predetermined fixed ratio of the recording tape speed.

10 Claims, 2 Drawing Figures

TAPE CLEANER

BACKGROUND OF THE INVENTION

Field of the Invention

The present invention is related to recorders. More specifically, the present invention is directed to a tape cleaner for a recording tape.

SUMMARY OF THE INVENTION

An object of the present invention is to provide an improved recording tape cleaner.

In accomplishing this and other objects, there has been provided, in accordance with the present invention, a tape cleaner having a cleaning medium driven between a supply reel and a take-up reel while being in contact at a predetermined location with a face of a recording tape. The cleaning medium is driven between the supply reel and the take-up reel at a selectively variable speed which is a sub-multiple of a selected recording tape speed of a plurality of available tape speeds.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
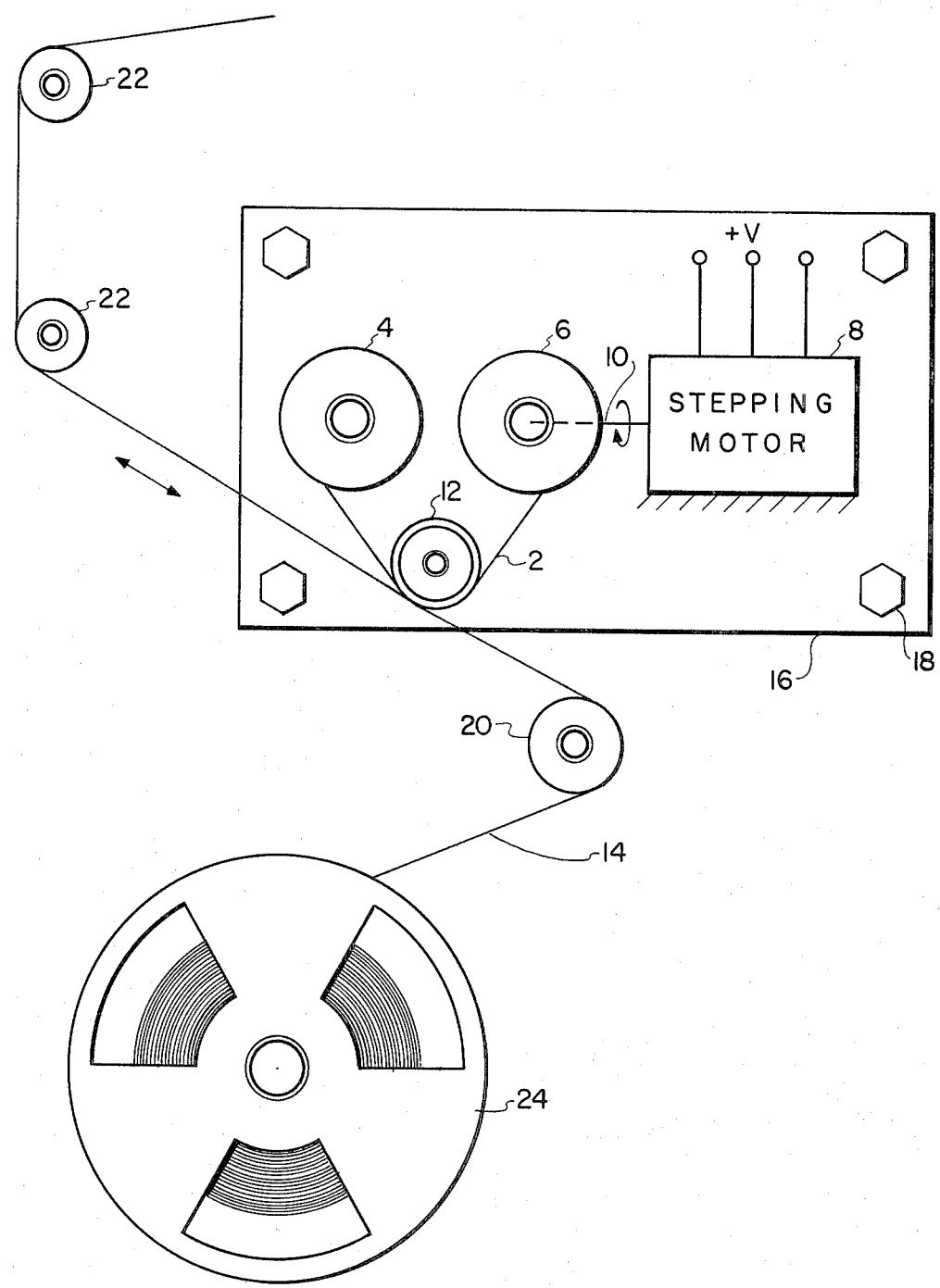
FIG. 1 is a pictorial illustration of a tape cleaner embodying an example of the present invention and being mounted on a recording tape drive apparatus and FIG. 2 is a block diagram of a drive circuit for the tape cleaner apparatus shown in FIG. 1.

Referring to FIG. 1 in more detail, there is shown a tape cleaner apparatus embodying an example of the present invention and having a cleaning medium, e.g., a cleaning tape 2, extending between a supply spool or reel 4 and a take-up spool or reel 6. The take-up reel 6 is driven by a stepping motor 8 by means of a drive shaft 10 connected between a stepping motor 8 and the take-up reel 6. The cleaning tape 2 is driven across a post 12 located between the supply reel 4 and the take-up reel 6 to position the cleaning tape 2 between the post 12 and a face of a recording tape 14. A mounting plate 16 is arranged to support the elements of the tape cleaning apparatus and is attached to the recording tape drive equipment by attaching bolts 18. The recording tape 14 is further disposed across a pair of idler rollers located on respective sides of the post 12. The recording tape 14, which may be a magnetic recording tape, is wound on a tape storage reel 24 which is driven by a reel motor (not shown). A tape drive capstan 26 is located in contact with the recording tape 14 to provide a drive for the recording tape 14 as more fully described hereinafter with respect to FIG. 2. The recording tape drive equipment may include additional devices such as vacuum columns, tape position sensors, etc. which are well-known in the art and a further discussion thereon is believed to be unnecessary for a complete understanding of the present invention.

Figure 2:
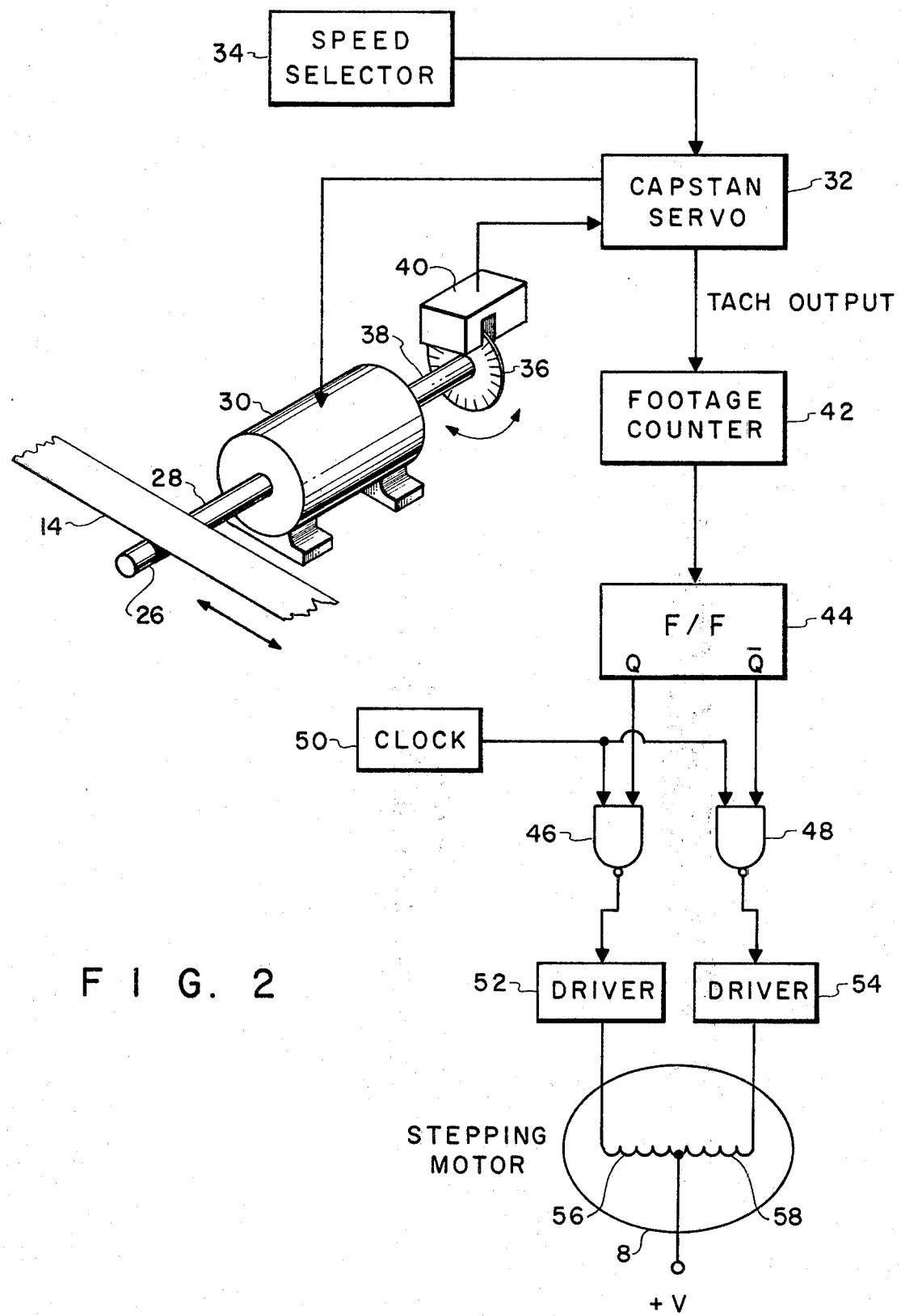

In FIG. 2, there is shown a block diagram of a drive circuit for the stepping motor 8 to drive the cleaning tape 2. The capstan 26 used to drive the recording tape 14 is a first extension 28 of the output shaft of a capstan motor 30. The capstan motor 30 is driven by a capstan servo circuit 32 in a manner well-known in the art. The capstan servo circuit 32 is controlled by a speed selector 34 which may include a tape speed selection control on the tape drive equipment for enabling the selection of a tape speed. Such a tape speed selection control is also well-known in the art. The capstan servo circuit 32 receives a feedback signal indicative of the speed of the capstan 26 from a tone wheel 36 mounted on a second extension 38 of the motor shaft of the capstan drive motor 30. A conventional pick-up device 40 is arranged to sense coded indicia on the tone wheel 36 to provide an output signal as a series of pulses having a frequency representative of the speed of the tone wheel 36. This capstan speed related signal is applied to the capstan servo circuit 32 to provide a signal for controlling the speed of the capstan motor 30 at the selected speed.

The output of the tone wheel, i.e., a so-called tachometer output, is also applied to a footage counter 42. The footage counter 42 is arranged to subdivide the frequency of the tachometer output signal by a predetermined factor, e.g., 40K. Using this example of a subdivision operation, the system provides one pulse from the output of the footage counter 42 for every foot of recording tape 14 driven by the capstan motor 30 and capstan 26. The output pulse from the footage counter 42 is applied to a complementing input of a flip-flop 44 to switch the outputs of the flip-flop Q and $\overline{Q}$ alternatively between high level signals. The outputs Q and $\overline{Q}$ of the flip-flop 44 are applied to first inputs of respective NAND gates 46 and 48. A signal for the second inputs to the NAND gates 46 and 48 is obtained from a clock source or one shot circuit 50. The energization of a NAND gate by the flip-flop 44 allows the clock signal from the clock circuit 50 to be applied to a respective one of a pair of motor driver circuits 52, 54. Output signals from the motor driver circuits 52, 54 are, in turn, applied to the windings 56 and 58 of the stepping motor 8. Thus, for each output pulse from the footage counter 42 the clock signal from the clock 50 is applied to a respective one of the motor windings 56, 58 to produce an incremental rotation of the stepping motor 8 whereby the cleaning tape 2 is advanced a corresponding incremental amount. Since the output of the footage counter 42 is dependent on the speed of the recording tape 14 as represented by the output of the tone wheel 36, the cleaning tape 2 does not operate at a fixed tape speed. In other words, the cleaning tape 2 moves at a speed correlated to the speed of the recording tape, e.g., approximately one-half of an inch of cleaning tape is used during the cleaning of a 9200 foot roll of recording tape in a typical application. Specifically, the cleaning tape 2 operates over a 384:1 speed range or 0.937 ips through 360 ips. Thus, the cleaning tape drive circuit advancing the cleaning tape 2 at a recording tape correlated speed eliminates the problem of quickly using up a roll of cleaning material as would be achieved by driving the cleaning tape at a constant speed particularly when a recording tape is operated at a slow tape speed. Accordingly, the present invention eliminates the attendant problem of numerous changes of rolls of cleaning tape during a short term usage of the recording tape as associated with a conventional cleaning tape drive apparatus.

Accordingly, it may be seen that there has been provided, in accordance with the present invention, an improved tape cleaner for a recording tape.

The embodiments of the invention in which an exclusive property or privilege is claimed are defined as follows:

1. A tape cleaner comprising
    a tape wiping medium,
    medium support means for supporting said medium in contact with a face of a tape to be cleaned,
    medium drive means for transporting said medium past said face of the tape to the cleaned in response to a drive signal,
    tape drive means for driving a tape to be cleaned at a pre-selected tape speed in response to a control signal,
    tape speed selection means for producing said control signal for controlling said tape drive means at a selected one of a plurality of different tape speeds, and
    drive signal means connected to said tape drive means for developing said drive signal to drive said wiping medium at a sub-multiple of said selected tape speed.

2. A tape cleaner as set forth in claim 1 wherein said wiping medium is a tape supported between a pair of tape reels.

3. A tape cleaner as set forth in claim 2 wherein said medium drive means includes a medium drive motor arranged to drive one of said pair of tape reels.

4. A tape cleaner as set forth in claim 3 wherein said motor is a stepping motor and said drive signal is a series of pulses for incrementally advancing said driven one of said pair of tape reels.

5. A tape cleaner as set forth in claim 4 wherein said tape drive means includes a tape drive motor, a tape drive capstan arranged to be driven by said tape drive motor and a sensing means for producing a series of pulses having a frequency proportional to said selected tape speed.

6. A tape cleaner as set forth in claim 5 wherein said drive signal means includes a counter for counting said series of pulses to produce an output pulse for a predetermined number of said series of pulses as said drive signal.

7. A tape cleaner as set forth in claim 6 wherein said output pulse is produced for a count of 40,000 pulses of said series of pulses.

8. A tape cleaner as set forth in claim 7 wherein said drive signal means includes a clock signal means for producing a fixed frequency clock signal, a flip-flop, a pair of two input NAND gates, each having a first input connected to said clock signal means, a second input connected to respective output of said flip-flop and a pair of motor drive circuits each having an input connected to an output of a respective one of said NAND gates and an output connected to said medium drive motor.

9. A tape cleaner as set forth in claim 1 wherein said sub-multiple is a ratio of 384:1.

10. A tape cleaner as set forth in claim 5 wherein said sensing means includes a tone wheel driven by said tape drive capstan and means for sensing indicia recorded on said tone wheel to produce the series of pulses.

* * * * *